(12) United States Patent
Katz

(10) Patent No.: US 11,185,017 B2
(45) Date of Patent: Nov. 30, 2021

(54) SYSTEM AND METHOD FOR CONTROLLING LIGHT IN A FACILITY

(71) Applicant: Palram Applications (1995) Ltd., M.P Misgav (IL)

(72) Inventor: Geva Katz, Manof (IL)

(73) Assignee: Palram Applications (1995) Ltd., M.P Misgav (IL)

( * ) Notice: Subject to any disclaimer, the term of this patent is extended or adjusted under 35 U.S.C. 154(b) by 351 days.

(21) Appl. No.: 16/459,627

(22) Filed: Jul. 2, 2019

(65) Prior Publication Data

US 2020/0008367 A1 Jan. 9, 2020

Related U.S. Application Data

(60) Provisional application No. 62/693,507, filed on Jul. 3, 2018.

(51) Int. Cl.
| | |
|---|---|
| *A01G 9/22* | (2006.01) |
| *A01G 9/14* | (2006.01) |
| *G02B 5/08* | (2006.01) |

(52) U.S. Cl.
CPC .............. *A01G 9/222* (2013.01); *A01G 9/14* (2013.01); *G02B 5/0808* (2013.01)

(58) Field of Classification Search
CPC ........ A01G 9/222; A01G 9/14; A01G 9/1415; A01G 9/1469; A01G 9/22; A01G 9/227; A01G 9/241; A01G 9/242; E06B 3/46; E06B 2009/543; E06B 2009/2417
See application file for complete search history.

(56) References Cited

U.S. PATENT DOCUMENTS

| | | | | |
|---|---|---|---|---|
| 3,481,073 | A | * 12/1969 | Eiichi | A01G 9/22 47/17 |
| 4,128,307 | A | * 12/1978 | Badertscher | E04F 10/10 359/596 |
| 4,462,452 | A | * 7/1984 | Oskam | A01G 9/222 160/176.1 R |
| 4,565,230 | A | * 1/1986 | Van Rijn | A01G 9/22 160/84.01 |
| 6,170,551 | B1 | * 1/2001 | Henningsson | A01G 9/22 160/84.06 |

(Continued)

FOREIGN PATENT DOCUMENTS

| | | | | |
|---|---|---|---|---|
| EP | 0070093 | A2 * | 1/1983 | A01G 9/222 |
| FR | 2566454 | A1 * | 12/1985 | A01G 9/222 |

*Primary Examiner* — Kristen C Hayes
(74) *Attorney, Agent, or Firm* — Pearl Cohen Zedek Latzer Baratz LLP

(57) ABSTRACT

A system for controlling light in a facility may include at least one rail longitudinally affixable to an inner portion of a frame of the facility between a first end and a second end of the facility and at a rail-height above a floor of the facility; and at least one opaque/reflective covering tightly and opaquely affixable to the inner portion of the facility frame at a cover-height above the facility floor in a first plane that faces the facility floor and slidably connectable to the at least one rail, the at least one opaque/reflective covering being extendable along the at least one rail between a first covering position and a second covering position to opaquely cover respective at least one longitudinal section of the facility in the first plane when in the second covering position, without substantially covering the facility walls.

11 Claims, 13 Drawing Sheets

(56) References Cited

U.S. PATENT DOCUMENTS

| | | | |
|---|---|---|---|
| 6,442,903 B1 * | 9/2002 | Hebert | A01G 9/1415 52/2.11 |
| 10,560,050 B2 * | 2/2020 | Raghunathan | E04F 10/08 |
| 2007/0051054 A1 * | 3/2007 | Devincenzo | A01G 9/242 52/72 |
| 2008/0128095 A1 * | 6/2008 | Van Zutven | A01G 9/22 160/22 |
| 2015/0164004 A1 * | 6/2015 | Kodama | A01G 9/14 47/17 |
| 2017/0086392 A1 * | 3/2017 | Van Deursen | E04D 13/064 |

\* cited by examiner

400

410 Providing opaque/reflective facility walls

420 Reversibly and opaquely covering at least one longitudinal section of the facility in a first plane that faces a floor of the facility and elevated by a cover-height above the floor, with respective at least one opaque/reflective covering, without substantially covering the opaque facility walls, to thereby prevent light transmittance into the facility

*Figure 4*

SYSTEM AND METHOD FOR CONTROLLING LIGHT IN A FACILITY

CROSS REFERENCE TO RELATED APPLICATIONS

This application claims the benefit of U.S. Provisional Patent Application No. 62/693,507, filed on Jul. 3, 2018, which is incorporated herein by reference in its entirety.

FIELD OF THE INVENTION

The present invention relates to the field of systems for controlling light in a facility and, more particularly, to the systems thereof including extendable coverings.

BACKGROUND OF THE INVENTION

Current systems for controlling light in a facility, such as greenhouses, are typically installable onto a dedicated support and are operated using motors assemblies to control light entrance into the facility.

SUMMARY OF THE INVENTION

One aspect of the present invention provides a system for controlling light in a facility having a facility frame, a first facility end, a second facility end, a facility floor and opaque facility walls, the system may include: at least one rail affixable to an inner portion of the facility frame between the first facility end and the second facility end and at a rail-height above the facility floor; and at least one opaque/reflective covering tightly and opaquely affixable to the inner portion of the facility frame at a cover-height above the facility floor in a plane that is parallel to the facility floor and slidably connectable to the at least one rail, the at least one opaque/reflective covering being extendable along the at least one rail between a first covering position and a second covering position to opaquely cover respective at least one longitudinal section of the facility in the plane when in the second covering position, without substantially covering the facility walls, to thereby prevent light transmittance into the facility.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same can be carried into effect, reference will now be made, purely by way of example, to the accompanying drawings in which like numerals designate corresponding elements or sections throughout.

In the accompanying drawings:

FIG. 4 is a flowchart of a method of controlling light in a facility, according to some embodiments of the invention.

Figure 1A:
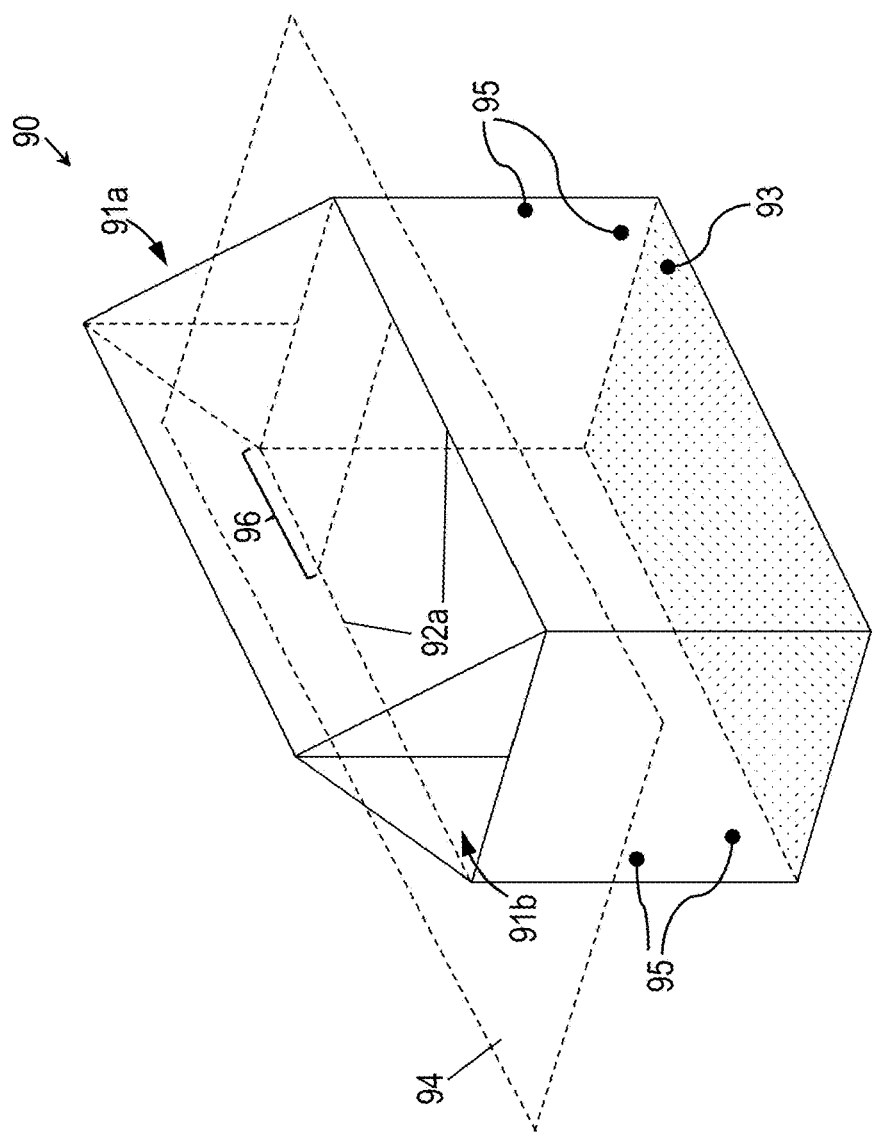
FIGS. 1A, 1B, 1C, 1D, 1E and 1F are schematic illustrations of various configurations of a system for controlling light in a facility, according to some embodiments of the invention.
Figure 1A:
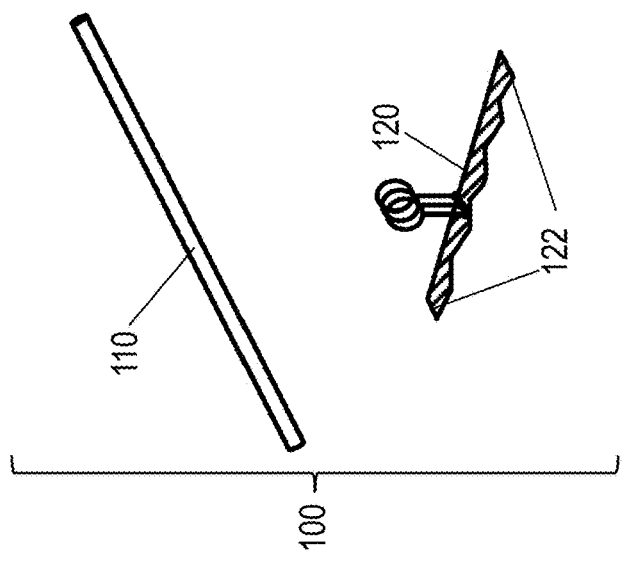

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention are described. For purposes of explanation, specific configurations and details are set forth in order to provide a thorough understanding of the present invention. However, it will also be apparent to one skilled in the art that the present invention can be practiced without the specific details presented herein. Furthermore, well known features can have been omitted or simplified in order not to obscure the present invention. With specific reference to the drawings, it is stressed that the particulars shown are by way of example and for purposes of illustrative discussion of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention can be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that can be practiced or carried out in various ways as well as to combinations of the disclosed embodiments. Also, it is to be understood that the phraseology and terminology employed herein is for the purpose of description and should not be regarded as limiting.

Generally, a system for controlling light in a facility, such as greenhouse, is provided. The system may include at least one rail, such as cable(s). Rail(s) that may be longitudinally affixable to an inner portion of a frame of the facility between a first end and a second end of the facility at a rail-height above a floor of the facility.

The system may include at least one opaque/reflective covering. Covering(s) may be tightly and opaquely affixable to the inner portion of the facility frame at a cover-height above the facility floor in a first plane that faces (or substantially faces) the facility floor. The covering(s) may be flat (or substantially flat) and may be affixed to the facility frame without covering (or substantially without covering) walls of the facility. The covering(s) may be slidably connectable to the rail(s) and may be extendable along the rail(s) between a first (folded) position and a second (extended/stretched) position to opaquely cover respective longitudinal section(s) of the facility in the first plane when in the second position(s) thereof. In various embodiments, single covering or, alternatively, two or more opaquely interconnectable coverings may be used to completely cover the whole longitudinal section of the facility in the first plane to thereby eliminate light transmittance through the covering(s) thereof when stretched to the second position.

In some embodiments, the system may be used in the facility having opaque/reflective walls, such that no light may enter to the facility when the covering(s) are in the second (stretched) position. Alternatively or complementarily, the walls of the facility may be painted with bright and opaque color prior/during/upon installation of the system within the facility.

Advantageously, the disclosed system may be installed on the facility frame and may be manually operated to allow/prevent light entrance into the facility, thereby eliminating a need in complex and expensive additional dedicated supports and motors assemblies, which are typically required in current systems.

Reference is now made to FIGS. 1A, 1B, 1C, 1D, 1E and 1F, which are schematic illustrations of various configurations of a system 100 for controlling light in a facility 90, according to some embodiments of the invention.

System 100 may include at least one rail 110. Rail(s) 110 may be longitudinally affixable to a frame 92 of facility 90 between a first end 91a and a second end 91b of facility 90 and at a predetermined rail-height 111 above a floor 93 of facility 90. In some embodiments, rail-height 111 may range between 1.5 m and 4 m.

System 100 may include at least one covering 120. Covering(s) 120 may be made from an opaque and/or reflective material that prevents transmittance of light therethrough. For example, covering(s) 120 may be made from at least one of: polyester black fabric, mylar reflective film, polyester reflective film and/or reflective aluminium film. It would be appreciated that covering(s) 120 may be made from other materials as well.

Covering(s) 120 may be affixable to frame 92 of facility 90 at a predetermined cover-height 121 above floor 93 of facility 90. In some embodiments, cover-height 121 may range between 1.5 m and 4 m. In various embodiments, covering(s) 120 may be affixable above or below rail(s) 110 with respect to floor 93 of facility 90.

In some embodiments, covering(s) 120 may be substantially flat and may be affixable to frame 92 at cover-height 121 in a plane 94 that faces (or substantially faces) floor 93 of facility 90, without covering (or substantially without covering) walls 95 of facility 90 (e.g., as shown in FIGS. 1B, 1C, 1D and 1E). In some embodiments, plane 94 may be parallel to floor 94. In these embodiments, walls 95 of facility 90 may be opaque in order to prevent light transmittance therethrough. For example, inner portion of walls 95 may be painted with bright color in order to facilitate maximal effect of the light when the covers are opened while providing maximal darkening when the covers are closed.

Figure 1B:
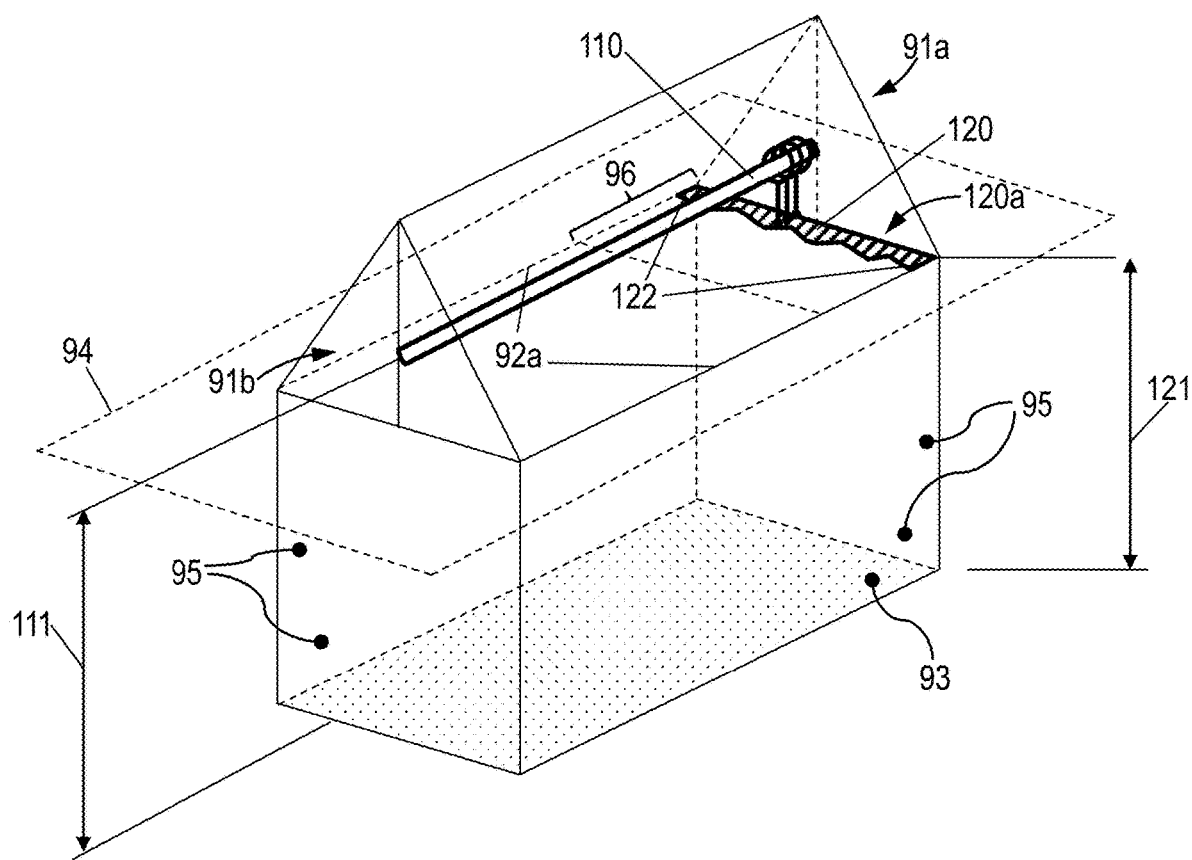
Figure 1C:
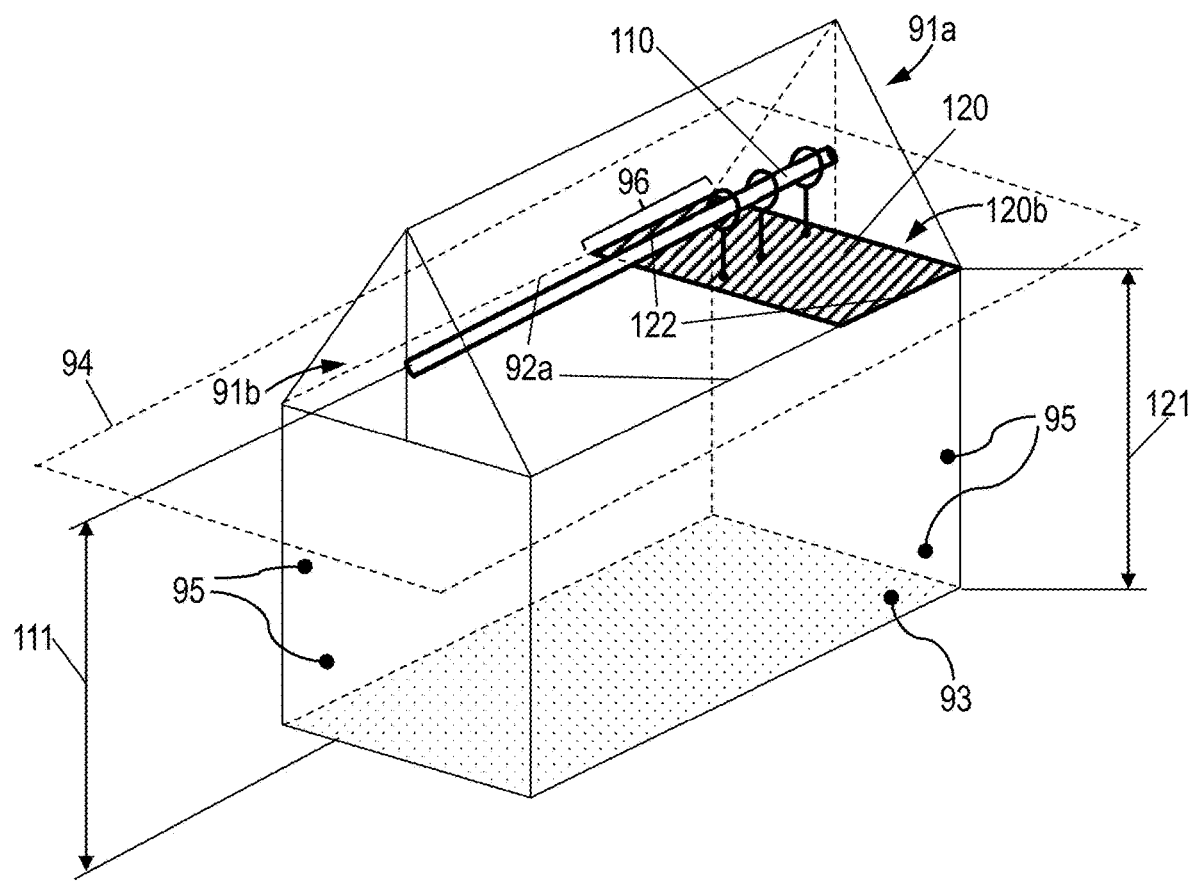

In some embodiments, covering(s) 120 may include connectors at least along longitudinal edges 122 thereof. The connectors thereof may be arranged to opaquely affix covering(s) 120 at least to longitudinal edges 92a of frame 92 (e.g., as shown in FIGS. 1B and 1C and as described below with respect to FIGS. 2C and 2D).

Covering(s) 120 may be slidably connectable to rail(s) 120. Coverings(s) 120 may be extendable/stretchable along rail(s) 120 (e.g., in a longitudinal direction extending between first end 91a and second end 91b of facility 90) between a first (folded) position 120a (e.g., as shown in FIG. 1B) and a second (extended/stretched) position 120b (e.g., as shown in FIG. 1C). Covering(s) 120 may tightly and opaquely cover respective section(s) 96 of facility 90 in plane 94 when in second position 120b, without covering (or substantially without covering) walls 95 of facility 90.

Figure 1D:
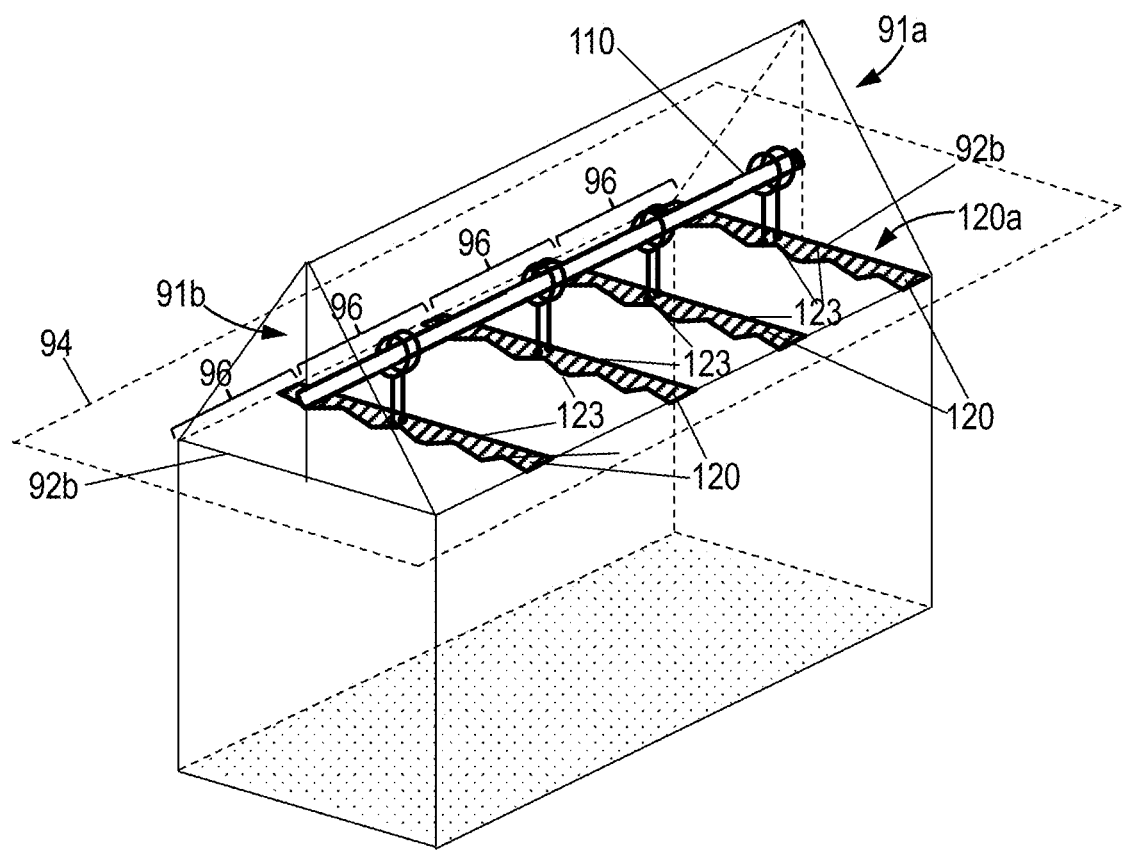
Figure 1E:
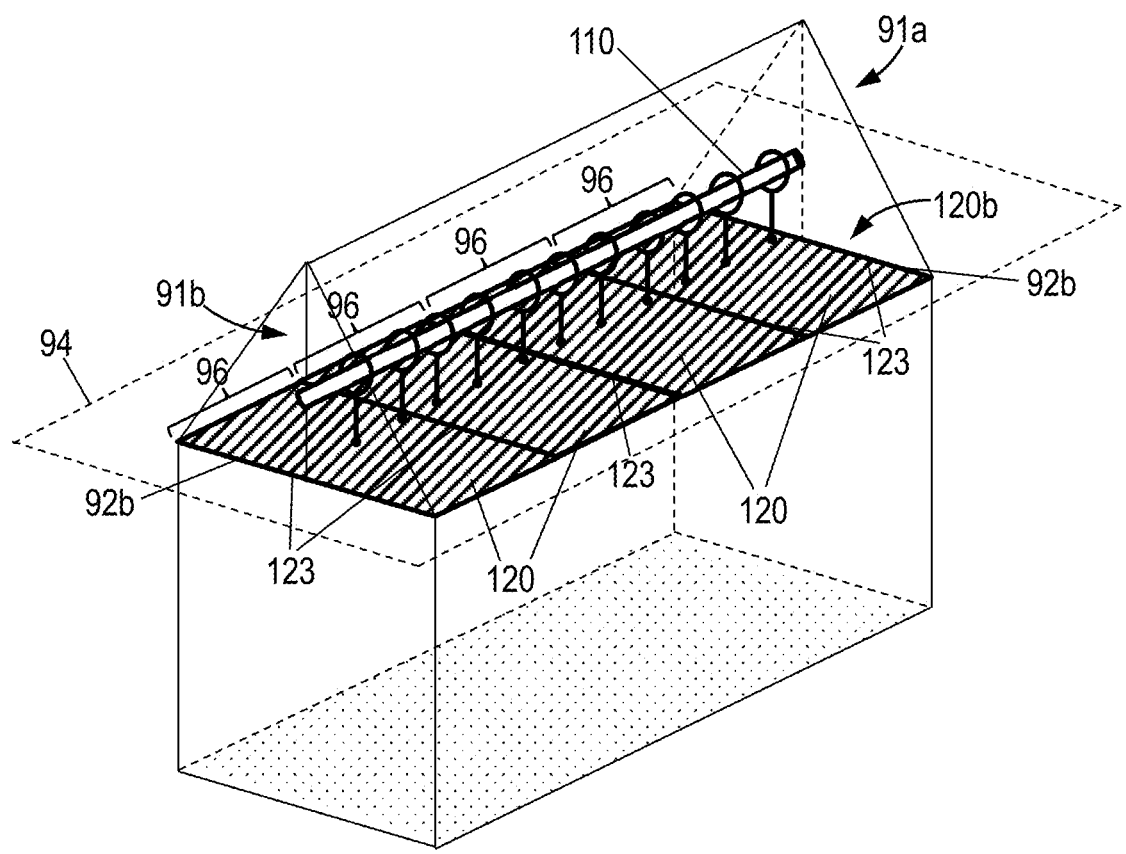

According to some embodiments, system 100 may include two or more coverings 120. For example, FIGS. 1D and 1E show system 100 that includes four (4) coverings 120. Each of coverings 120 may be arranged to tightly and opaquely cover respective section 96 in plane 94 of facility 90 when in second position 120b (e.g., as shown in FIG. 1E).

In some embodiments, each of coverings 120 may include connectors along traversal edges 123 (e.g., that are substantially perpendicular to longitudinal edges 122). The connectors thereof may be arranged to tightly and opaquely interconnect coverings 120 therebetween and/or to tightly and opaquely connect at least some of coverings 120 to traverse edges 92b of facility 90 (e.g., at first end 91a and second end 91b) (e.g., as shown in FIGS. 1D and 1E as described below with respect to FIG. 2D).

In some embodiments, additional coverings 120 may be used to extend facility 90 in its longitudinal direction. For example, longitudinal sections (e.g., including additional wall and roof elements) may be coupled to facility at second facility end 91b, and additional interconnectable coverings 120 may be added to further cover the additional longitudinal sections thereof.

Figure 1F:
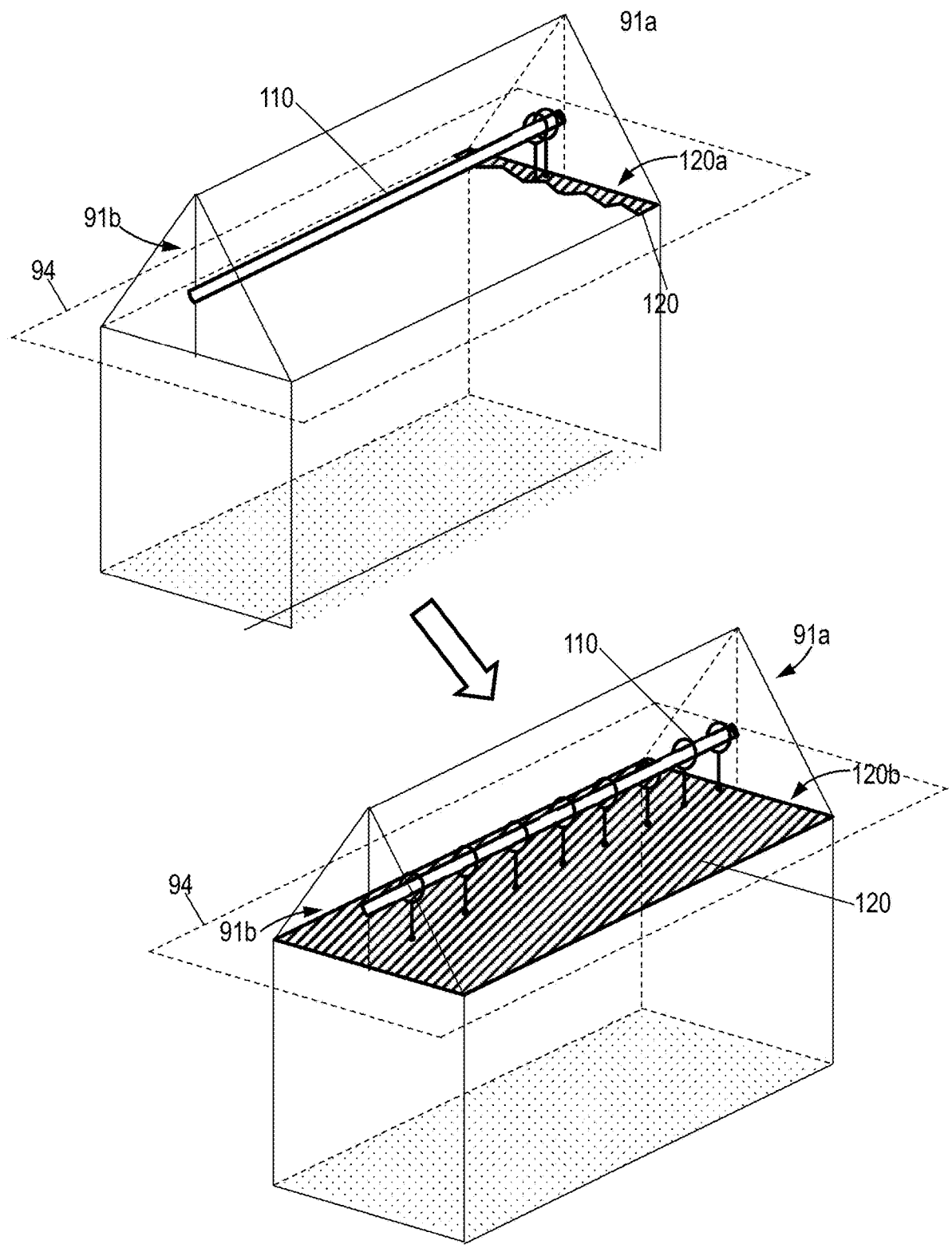

It should be appreciated that the number of coverings 120 and/or longitudinal dimension of covering(s) 120 in second position 120b may be determined based on, for example, a length of facility 90. Alternatively or complementarily, single covering 120 may be arranged to tightly and opaquely cover the whole facility 90 in plane 94 (e.g., as shown in FIG. 1F).

Reference is now made to FIGS. 2A, 2B, 2C, 2D and 2E, which are schematic illustrations of a more detailed aspect of a system 200 for controlling light in a facility 90, according to some embodiments of the invention.

According to some embodiments, system 200 may include at least one rail 210 and at least one covering 220.

Rail(s) 210 may be similar to, for example, rail(s) 110, e.g., as described above with respect to FIGS. 1A, 1B, 1C, 1D, 1E and 1F. Rail(s) 210 may be longitudinally affixable to a frame 92 of facility 90 between first end 91a and second end 91b of facility 90 and at predetermined rail-height 211 above floor 93 of facility 90. In some embodiments, rail(s) 210 may be cables (e.g., as shown in FIGS. 2A and 2B).

Covering(s) 220 may be similar to, for example, covering(s) 120. e.g., as described above with respect to FIGS. 1A, 1B, 1C, 1D, 1E and 1F. In various embodiments, system 200 may include single covering 120 (e.g., as described above with respect to FIG. 1F) or two or more interconnectable coverings 120 (e.g., as described above with respect to FIGS. 1D and 1E).

Covering(s) 220 may be tightly and opaquely affixed to frame 92 of facility 90 at a cover-height 221 above floor 93 of facility 90. Coverings(s) 220 may be extendable/stretchable along rail(s) 210 (e.g., in a longitudinal direction extending between first end 91a and second end 91b of facility 90) between a first (folded) position 220a (e.g., as shown in FIG. 2A) and a second (extended/stretched) position 220b (e.g., as shown in FIG. 2B). Covering 220 or coverings 220 all together may tightly and opaquely cover the whole longitudinal section of facility 90 in plane 94 at cover-height 221 of facility 90, without covering (or substantially without covering) walls 95 of facility 90.

Figure 2A:
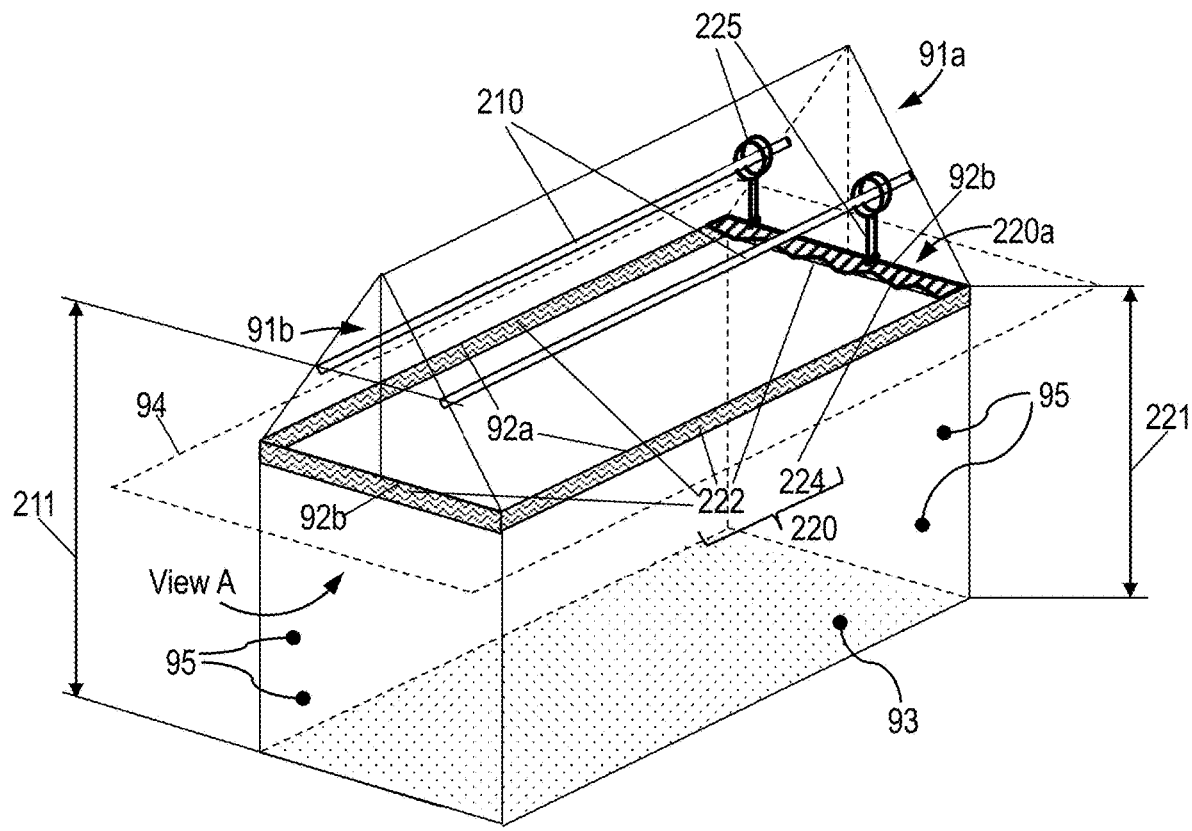
FIGS. 2A, 2B, 2C, 2D and 2E are schematic illustrations of a more detailed aspect of a system for controlling light in a facility, according to some embodiments of the invention.
Figure 2A:
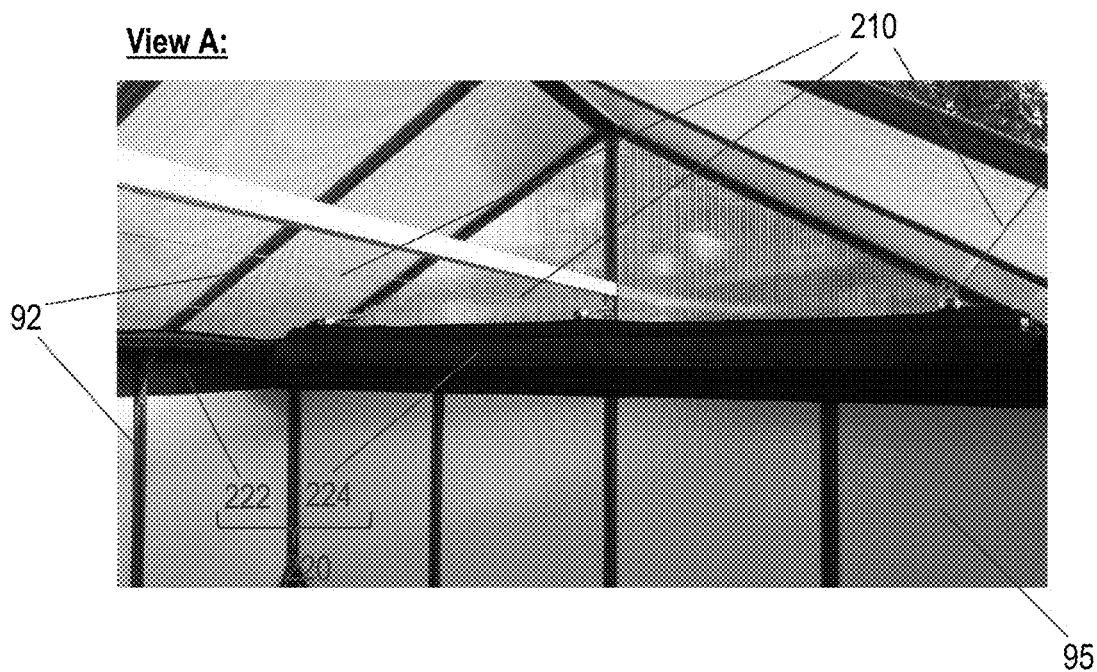
Figure 2B:
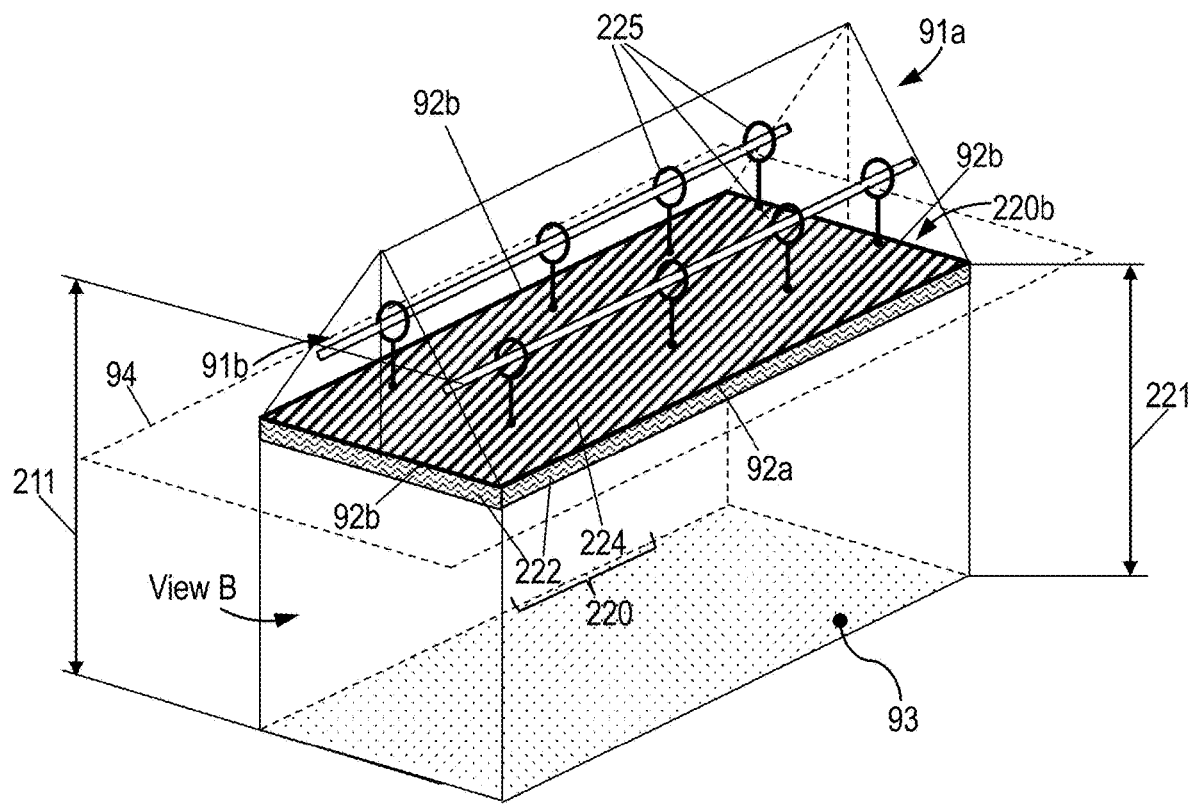
Figure 2B:
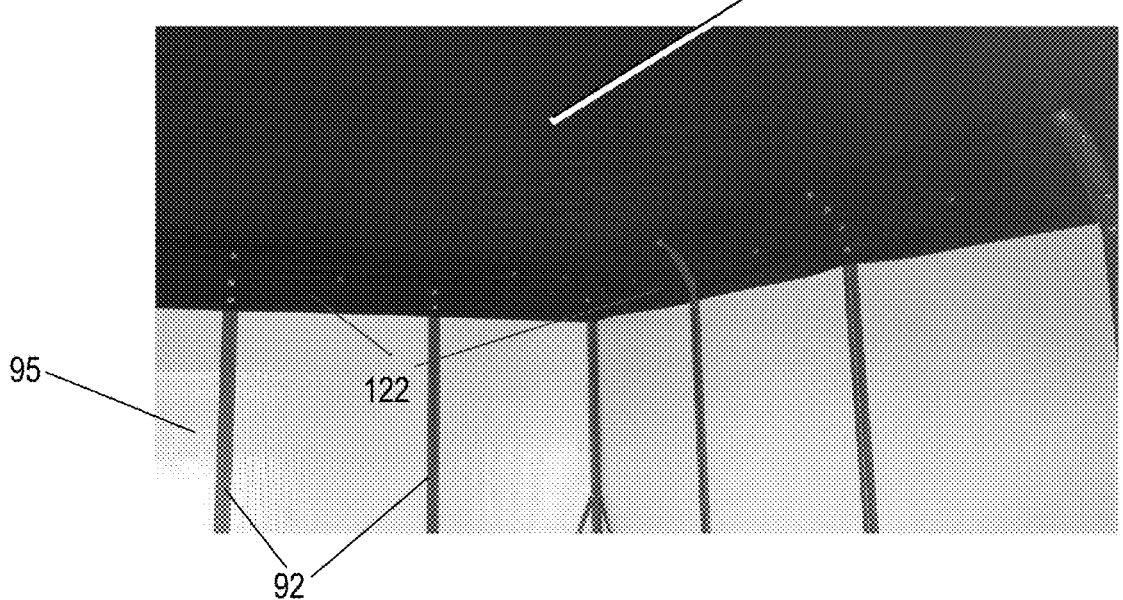

According to some embodiments, covering(s) 220 may include peripheral portion(s) 222 and central portion(s) 224 (e.g., as shown in FIGS. 2A and 2B).

Peripheral portion(s) 222 may be affixable along longitudinal edges 92a and/or along traverse edges 92b of facility 90 at cover-height 221. In some embodiments, peripheral portion(s) may be affixed along the whole perimeter of facility 90 (e.g., as shown in FIGS. 2A and 2B). In some embodiments, peripheral portion(s) 222 may be strips made of the opaque material that may be affixed to longitudinal edges 92a and/or traverse edges 92b of facility 90 without covering (or substantially without covering) walls 95 of facility 90 (e.g., as shown in FIGS. 2A and 2B). In some embodiments, the width of the strips of peripheral portion(s) 222 may, for example, range between 5 and 30 cm.

Figure 2C:
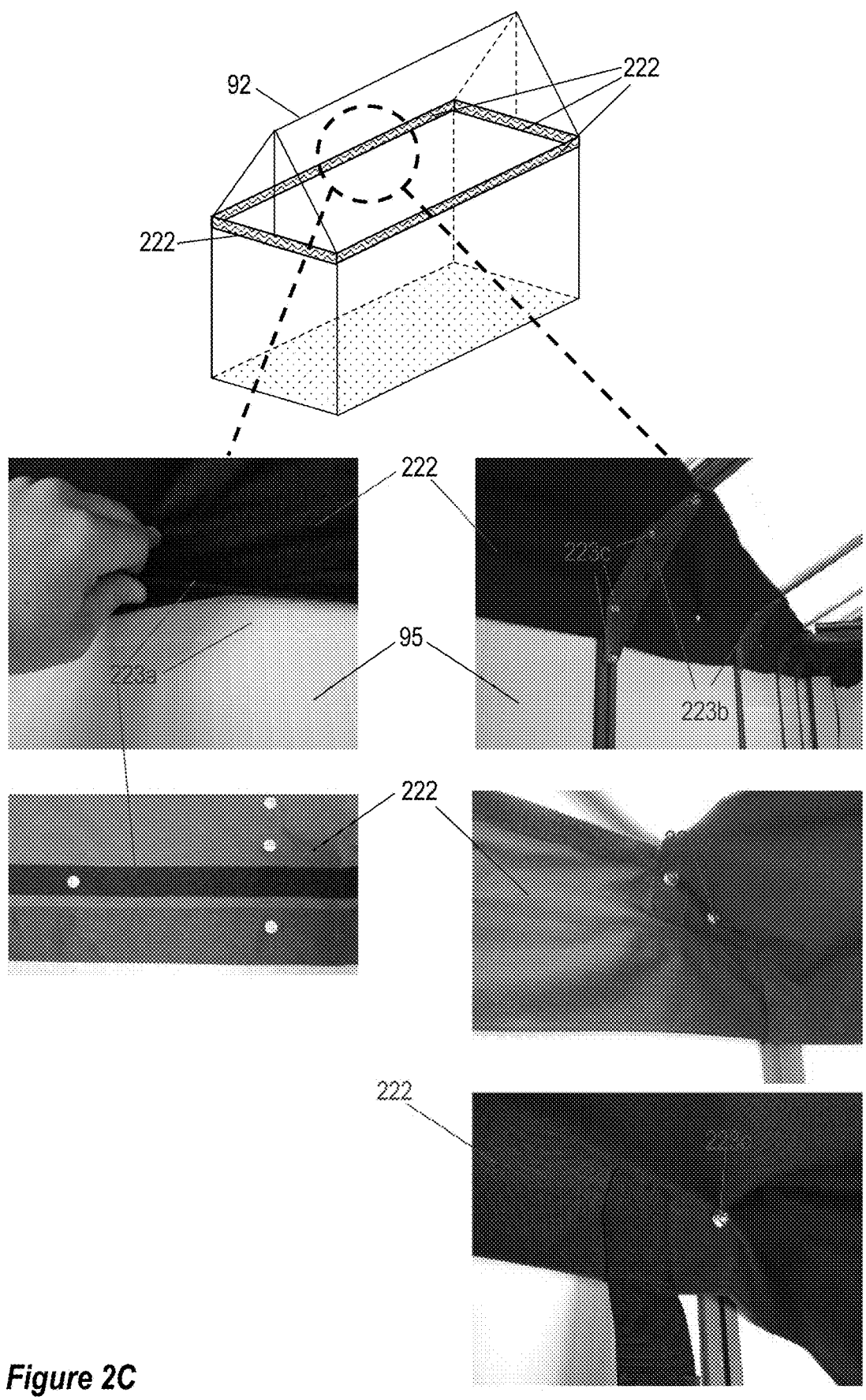
Figure 2D:
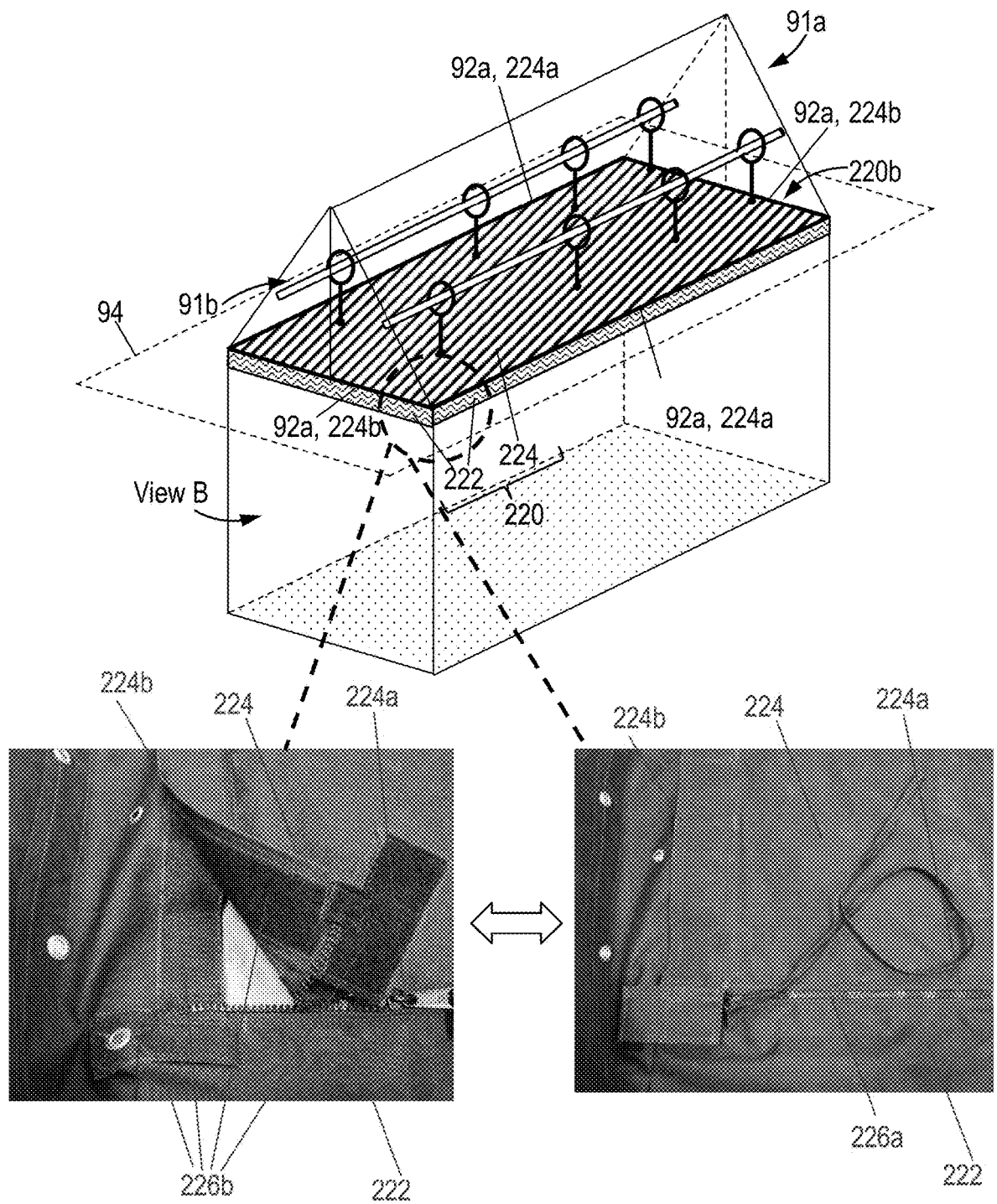

In some embodiments, peripheral portion(s) 222 may be affixed to frame 92 using first connectors 223. First connectors 223 may include at least one of: hook and loop connector 223a, brackets 223b, bolts 224c and/or fastener strip or foil. For example, peripheral portion(s) 222 may be affixed to frame 92 using hook and loop connector 223a along the whole perimeter of facility 90 and/or using brackets 223b and bolts 224c at predetermined distances with respect to each other along the perimeter thereof (e.g., as shown in FIG. 2C).

Figure 2E:
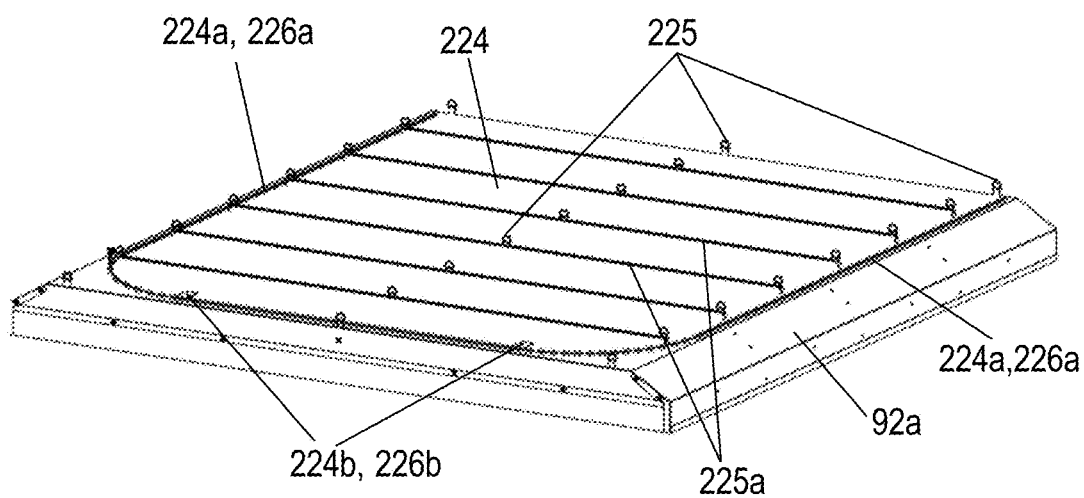

Central portion(s) 224 may be slidably connectable to cable(s)/rail(s) 210 using second connectors 225. Second connectors 225 may be, for example, rings-like connectors. It should be understood that any other type of second connectors 225 may be used, based on the type of rail(s) 210. In some embodiments, central portion(s) 224 may include enhancement strips 225a to which second connectors 225 may be attached (e.g., as shown in FIG. 2E).

Central portion(s) 224 may be extendable/stretchable along rail(s) 210 to switch covering(s) 220 between first (folded) position 220a (e.g., as shown in FIG. 2A) and second (extended/stretched) position 220b (e.g., as shown in FIG. 2B). Central portion(s) 224 may be tightly and opaquely connected to peripheral portion(s) 222 using third connectors 226, when in second position 220b, to thereby opaquely cover respective longitudinal sections of facility 90.

In some embodiments, third connectors 226 may include at least one of zippers 226a and/or hook and loop connectors 226b. Third connectors 226 may be arranged along peripheral portion(s) 222 and along longitudinal edges 224a and traverse edges 224b of central portion(s) 224 of respective covering(s) 220.

For example, zippers 226a may be arranged along peripheral portions 222 affixed to frame 92 along longitudinal edges 92a thereof and along respective longitudinal edges 224a of central portion(s) 224. In the same example, hook and loop connectors 226b may be arranged along peripheral sections 222 affixed to frame 92 along traverse edges 92b thereof and along traverse edges 224b of respective central portions 224. Zippers 226a may tightly and opaquely connect longitudinal edges 224a of central portion(s) 224 to peripheral portions 222 affixed to longitudinal edges 92a of facility 90. Hook and loop connectors 226b may interconnect central portions 224 therebetween along respective traverse edges 224b and/or may connect some of central portions 224 to peripheral portions 222 affixed to traverse edges 92b of facility 90 at first end 91a and second end 92 thereof.

It should be appreciated that other arrangements and/or combinations of third connectors 226 are possible. It should also be appreciated that other third connectors 226 may be used to tightly and opaquely connect central portions 224 to peripheral portions 222 and/or to tightly and opaquely interconnect central portions 224.

Figure 3A:
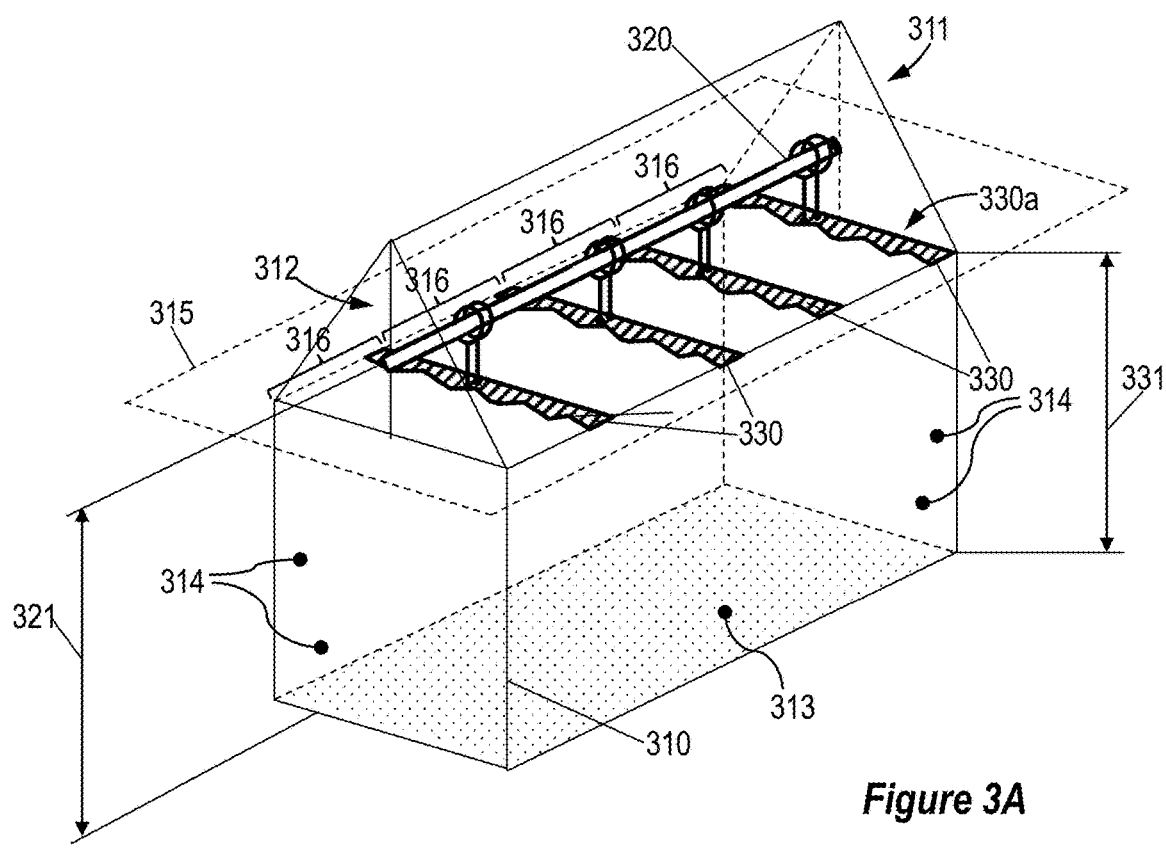
FIGS. 3A and 3B are schematic illustration of a facility, according to some embodiments of the invention.
Figure 3B:
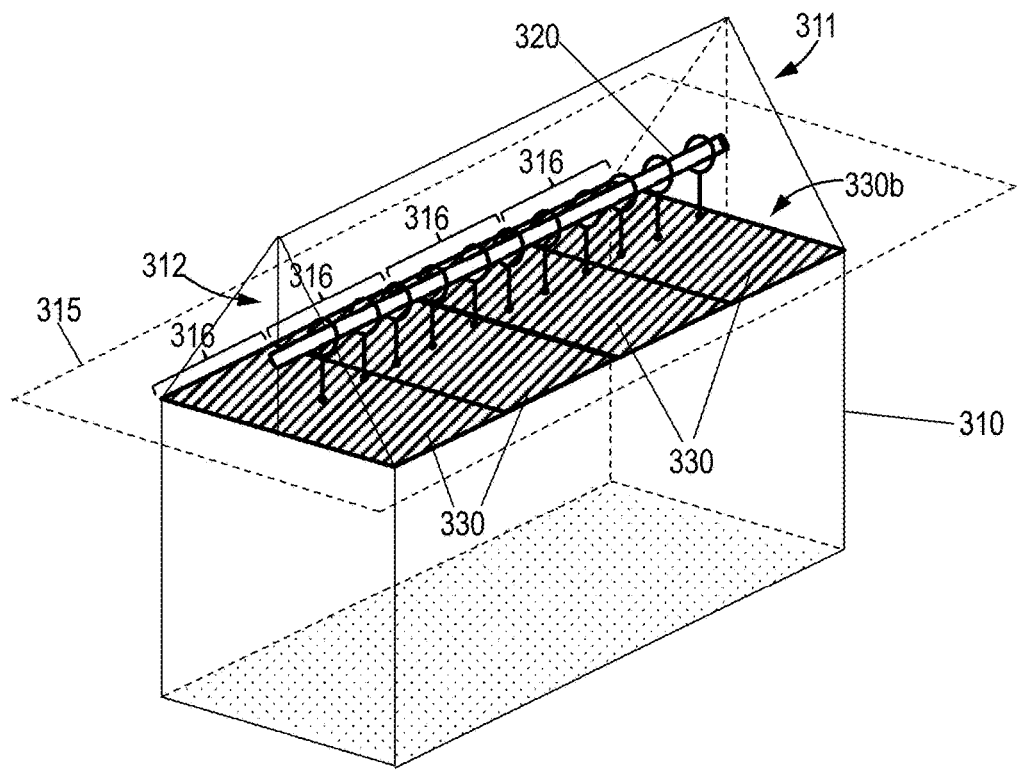

Reference is now made to FIGS. 3A and 3B, which are schematic illustrations of a facility 300, according to some embodiments of the invention.

According to some embodiments, facility 300, such as greenhouse, may have a facility frame 310, a first facility end 311, a second facility end 312, a facility floor 313 and facility walls 314. In various embodiments, facility walls 314 may be made from opaque material or may be painted with bright and opaque color.

Facility 300 may include at least one rail 320 longitudinally affixed to an inner portion of facility frame 310 between first facility end 311 and second facility end 312 and at a rail-height 321 above facility floor 313. In various embodiments, rail(s) 320 may be similar to rail(s) 110 (e.g., as described above with respect to FIGS. 1A, 1B, 1C, 1D, 1E and 1F) and/or may be similar to rail(s) 210 (e.g., as described above with respect to FIGS. 2A, 2B, 2C, 2D and 2E).

Facility 300 may include at least one opaque/reflective covering 330 tightly and opaquely affixable to the inner portion of facility frame 310 at a cover-height 331 above facility floor 313 in a first plane 315 that faces (or substantially faces) facility floor 313, and further slidably connectable to rail(s) 320. In some embodiments, first plane 314 may be parallel to facility floor 313. In various embodiments, covering(s) 330 may be similar to covering(s) 120 (e.g., as described above with respect to FIGS. 1A, 1B, 1C, 1D, 1E and 1F) or to covering(s) 220 (e.g., as described above with respect to FIGS. 2A, 2B, 2C, 2D and 2E).

Coverings 330 may be extendable along rail(s) 320 between a first (folded) position 330a (e.g., as shown in FIG. 3A) and a second (extended/stretched) position 330b (e.g., as shown in FIG. 3B) to opaquely cover respective at least one longitudinal section 316 of facility 300 in first plane 315 when in second position 330b, without substantially covering facility walls 314.

Reference is now made to FIG. 4, which is a flowchart of a method 400 of controlling light in a facility, according to some embodiments of the invention.

Method 400 may be implemented by system 100, system 200 or facility 300, which may be configured to implement method 400. It is noted that method 400 is not limited to the flowcharts illustrated in FIG. 4 and to the corresponding description. For example, in various embodiments, method 400 needs not move through each illustrated box or stage, or in exactly the same order as illustrated and described.

Method 400 may include providing opaque and/or reflective facility walls (e.g., as described above with respect to FIGS. 1A, 1B, 1C, 1D, 1E and 1F; FIGS. 2A, 2B, 2C, 2D and 2E; and FIGS. 3A and 3B) (stage 410).

Method 400 may include reversibly and opaquely covering at least one longitudinal section of the facility in a first plane that faces (or substantially faces) a floor of the facility and elevated by a cover-height above the floor, with respective at least one opaque/reflective covering, without substantially covering the opaque/reflective facility walls, to thereby prevent light transmittance into the facility (e.g., as described above with respect to FIGS. 1A, 1B, 1C, 1D, 1E and 1F; FIGS. 2A, 2B, 2C, 2D and 2E; and FIGS. 3A and 3B) (stage 420).

In some embodiments, method 400 may further include covering the whole longitudinal section of the facility in the first plane with single at least one opaque/reflective covering (e.g., as described above with respect to FIG. 1F).

In some embodiments, method 400 may further include covering two or more longitudinal section of the facility in the first plane with corresponding two or more opaque/reflective coverings and further opaquely interconnecting the two or more opaque/reflective coverings therebetween (e.g., as described above with respect to FIGS. 1D and 1E).

In the above description, an embodiment is an example or implementation of the invention. The various appearances of "one embodiment", "an embodiment", "certain embodiments" or "some embodiments" do not necessarily all refer to the same embodiments. Although various features of the invention can be described in the context of a single embodiment, the features can also be provided separately or in any suitable combination. Conversely, although the invention can be described herein in the context of separate embodiments for clarity, the invention can also be implemented in a single embodiment. Certain embodiments of the invention can include features from different embodiments disclosed above, and certain embodiments can incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A system for controlling light in a facility having a facility frame, a first facility end, a second facility end, a facility floor and opaque/reflective facility walls, the system comprising:
   at least one rail longitudinally affixable to an inner portion of the facility frame between the first facility end and the second facility end and elevated by a rail-height above the facility floor; and
   at least one opaque/reflective covering tightly and opaquely affixable to the inner portion of the facility frame and elevated by a cover-height above the facility floor in a first plane that faces the facility floor and slidably connectable to the at least one rail, the at least one opaque/reflective covering being extendable along the at least one rail between a first covering position and a second covering position to opaquely cover respective at least one longitudinal section of the facility in the first plane when in the second covering position, without substantially covering the opaque/reflective facility walls, to thereby prevent light transmittance into the facility.

2. The system of claim 1, wherein the at least one rail comprises at least one cable.

3. The system of claim 1, wherein the at least one opaque/reflective covering comprises connectors along longitudinal edges thereof, the connectors being arranged to tightly and opaquely connect the longitudinal edges of the at least one opaque/reflective covering to respective longitudinal edges of the facility frame.

4. The system of claim 3, wherein the connectors comprise at least one of: zipper, hook and loop, brackets, bolts and fastener strip or foil.

5. The system of claim 1, wherein the at least one opaque/reflective covering comprises connectors along traversal edges thereof, the connectors being arranged to tightly and opaquely interconnect the at least one opaque/reflective covering therebetween and to tightly and opaquely connect at least some of the at least one opaque/reflective covering to traverse edges of the facility at the first second end and the second facility end.

6. The system of claim 5, wherein the connectors comprise at least one of: zippers, hook and loop and fastener strip or foil.

7. The system of claim 1, wherein the facility is a greenhouse.

8. A facility comprising:
   a facility frame;
   a first facility end and a second facility end;
   a facility floor;
   opaque/reflective facility walls;
   at least one rail longitudinally affixable to an inner portion of the facility frame between the first facility end and the second facility end and elevated by a rail-height above the facility floor; and
   at least one opaque/reflective covering tightly and opaquely affixable to the inner portion of the facility frame and elevated by a cover-height above the facility floor in a first plane that faces the facility floor and slidably connectable to the at least one rail, the at least one opaque/reflective covering being extendable along the at least one rail between a first covering position and a second covering position to opaquely cover respective at least one longitudinal section of the facility in the first plane when in the second covering position, without substantially covering the opaque/reflective facility walls, to thereby prevent light transmittance into the facility.

9. A method of controlling light in a facility, the method comprising:
   providing opaque/reflective facility walls; and
   reversibly and opaquely covering at least one longitudinal section of the facility in a first plane that faces a floor of the facility and elevated by a cover-height above the floor, with respective at least one opaque/reflective covering, without substantially covering the opaque/reflective facility walls, to thereby prevent light transmittance into the facility.

10. The method of claim 9, further comprising covering the whole longitudinal section of the facility in the first plane with single at least one opaque/reflective covering.

11. The method of claim 9, further comprising covering two or more longitudinal sections of the facility in the first plane with corresponding two or more opaque/reflective coverings and further opaquely interconnecting the two or more opaque/reflective coverings therebetween.

* * * * *

UNITED STATES PATENT AND TRADEMARK OFFICE
CERTIFICATE OF CORRECTION

PATENT NO. : 11,185,017 B2
APPLICATION NO. : 16/459627
DATED : November 30, 2021
INVENTOR(S) : Geva Katz It is certified that error appears in the above-identified patent and that said Letters Patent is hereby corrected as shown below:

On the Title Page

Item (73), should read:
(73) Assignee: PALRAM CANOPIA LTD, Kibbutz Ramat Yohanan, Israel Signed and Sealed this
Seventh Day of March, 2023

Katherine Kelly Vidal
*Director of the United States Patent and Trademark Office*